United States Patent [19]
Fujita

[11] Patent Number: 6,115,886
[45] Date of Patent: Sep. 12, 2000

[54] HINGE APPARATUS

[75] Inventor: Oriya Fujita, Kanagawa, Japan

[73] Assignee: Katoh Electrical Machinery Co., Ltd., Kanagawa, Japan

[21] Appl. No.: 09/076,538

[22] Filed: May 12, 1998

[30] Foreign Application Priority Data

Jun. 16, 1997 [JP] Japan .................................. 9-158966

[51] Int. Cl.⁷ .............................. E05D 11/10; E05D 1/14; H01Q 1/24
[52] U.S. Cl. ................................ 16/330; 16/303; 16/328; 16/329; 16/284; 16/285; 343/702
[58] Field of Search .............................. 16/330, 303, 362, 16/329, 328, 327, 284, 285; 343/702; 455/90

[56] References Cited

U.S. PATENT DOCUMENTS

| | | | |
|---|---|---|---|
| 567,727 | 9/1896 | Schlutter | 16/330 |
| 1,946,837 | 2/1934 | Clayton | 16/303 |
| 2,097,651 | 11/1937 | Stangeland | 16/330 |
| 5,628,089 | 5/1997 | Wilcox et al. | 16/303 |
| 5,724,683 | 3/1998 | Sorimachi et al. | 4/248 |

*Primary Examiner*—Anthony Knight
*Assistant Examiner*—Vishal Patel
*Attorney, Agent, or Firm*—Notaro & Michalos P.C.

[57] ABSTRACT

A hinge apparatus for portable electronic devices such as portable telephones and handheld personal computers can be manufactured with a small and simple structure at a low cost. The hinge apparatus has a shaft with a flange, a cam engaged with an end of the shaft and; a slide cam engaged with the shaft between the cam and the flange. The slide cam is rotatably with the shaft and slidably in an axial direction. A compression spring is rolled around the shaft, and elastically provided between the slide cam and the flange. The cam has a pair of projections on one side surface at opposite positions, and the slide cam has cam members press-contacted with the projections. Otherwise, provided is a hinge apparatus which connects a microphone and a earphone of a portable telephone. The hinge apparatus comprises: a shaft having a flange with a rotation stopper, fixed in a hole provided at an attachment member in an axial direction provided at an end of the microphone or earphone, at one end; a cam having a rotation stopper, holding the shaft rotatably inserted through an insertion hole provided in a central axis direction of the shaft, engaged with the other end of the shaft, and fixed in a hole provided at an attachment member in the axial direction at an end opposite to the end where the flange is fixed; a slide cam, provided between the cam and the flange, engaged with the shaft inserted through a central portion, rotatably with the shaft and slidably in the axial direction; and a compression spring rolled around the shaft, and elastically provided between the slide cam and the flange. The cam has a pair of projections on one side surface at opposite positions, and the slide cam has cam members press-contacted with the projections.

8 Claims, 6 Drawing Sheets

HINGE APPARATUS

BACKGROUND OF THE INVENTION

1. Field of the Invention

This invention relates to a hinge apparatus preferably applicable to small electronic devices such as a portable telephone, a portable computer and an electronic pocket-notebook.

2. Prior Art

Conventionally, the hinge apparatus of this type has been called a tilt hinge, and various structures as combinations of various cams and springs have been known. However, these tilt hinges respectively have a too complicated structure, and they are manufactured at a high cost. In recent years, the industrial world must attain cost reduction, and even in the small electronic devices, downsizing and cost reduction are severely required.

SUMMARY OF THE INVENTION

Accordingly, an object of the present invention is to provide a hinge apparatus which meets technical requirements in the above-described hinges, and which can be manufactured with a small and simple structure at a low cost.

According to the present invention, the foregoing object is attained by providing a hinge apparatus comprising: a shaft having a flange at one end; a cam having a rotation stopper, holding said shaft rotatably inserted therethrough, engaged with the other end of said shaft; a slide cam, engaged with said shaft inserted into a central portion between said cam and said flange, rotatably with said shaft and slidably in an axial direction; and a compression spring rolled around said shaft, and elastically provided between said slide cam and said flange, wherein said cam has a pair of projections one side surface at opposite positions, and wherein said slide cam has cam members press-contacted with said projections.

Further, the foregoing object is attained by providing a hinge apparatus comprising: a shaft, having a flange with fixing means at one end, a deformed shaft at its central portion, and a cylindrical shaft at the other end; a cam having a rotation stopper, holding said cylindrical shaft of said shaft rotatably inserted therethrough, engaged with said cylindrical shaft; a slide cam, opposite to said cam, engaged with said deformed shaft of said shaft, and attached to said deformed shaft slidably in an axial direction; and a compression spring rolled around said shaft, and elastically provided between said slide cam and said flange, wherein said cam has a pair of projections on one side surface at opposite positions, and wherein said slide cam has cam members having a plurality of recesses and projections press-contacted with said projections.

Further, the foregoing object is attained by providing a hinge apparatus which connects a microphone and a earphone of a portable telephone with each other, comprising: a shaft having a flange with a rotation stopper, fixed in a hole provided at an attachment member in an axial direction provided at an end of said microphone or earphone, at one end; a cam having a rotation stopper, holding said shaft rotatably inserted through an insertion hole provided in a central axis direction of said shaft, engaged with the other end of said shaft, and fixed in a hole provided at an attachment member in the axial direction at an end opposite to the end where said flange is fixed; a slide cam, provided between said cam and said flange, engaged with said shaft inserted through a central portion, rotatably with said shaft and slidably in the axial direction; and a compression spring rolled around said shaft, and elastically provided between said slide cam and said flange, wherein said cam has a pair of projections on one side surface at opposite positions, and wherein said slide cam has cam members press-contacted with said projections.

Further, the foregoing object is attained by providing a hinge apparatus which connects a microphone and an earphone of a portable telephone with each other, comprising: a shaft having a flange with a rotation stopper, fixed in a hole provided at an attachment member in an axial direction provided at an end of said microphone or earphone, at one end; a cam having a rotation stopper, holding a cylindrical shaft of said shaft rotatably inserted through an insertion hole provided at a central axis direction of said shaft, engaged with said cylindrical shaft at the other end of said shaft, and fixed in a hole provided at an attachment member in the axial direction at an end opposite to the end where said flange is fixed; a slide cam, opposite to said cam, engaged with a deformed shaft of said shaft rotatably with the deformed shaft and slidably in the axial direction; and a compression spring rolled around said shaft, and elastically provided between said slide cam and said flange, wherein said cam has a pair of projections on one side surface at opposite positions, and wherein said slide cam has cam members having a plurality of recesses and projections press-contacted with said projections.

Other and further objects, features and advantages of the invention will appear more fully from the following description.

DETAILED DESCRIPTION OF THE PREFERRED EMBODIMENT

Figure 1:
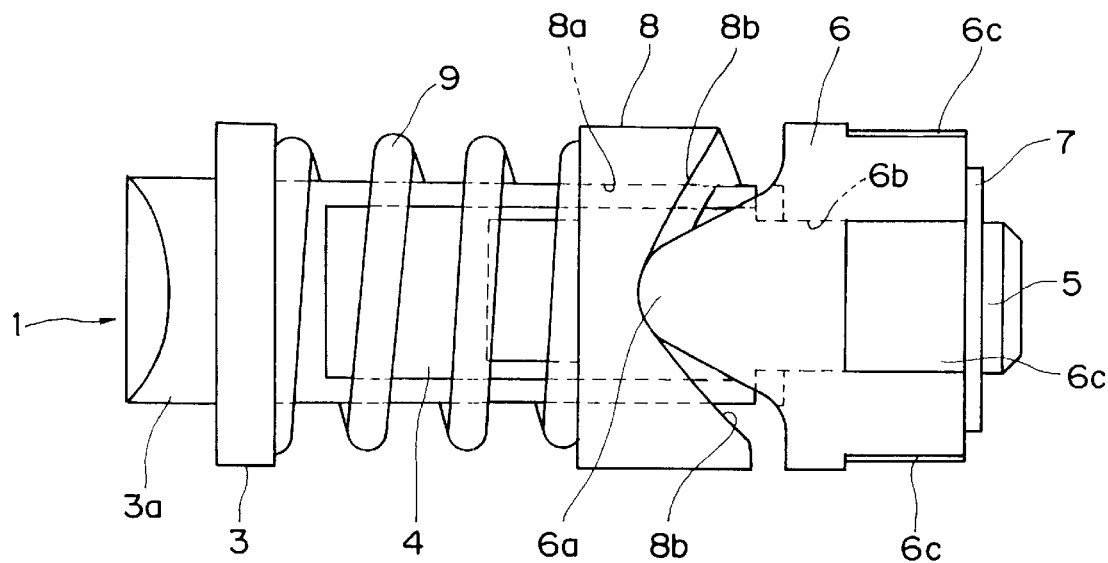
FIG. 1 is a front elevational view of a hinge apparatus according to the present invention.
Figure 2:
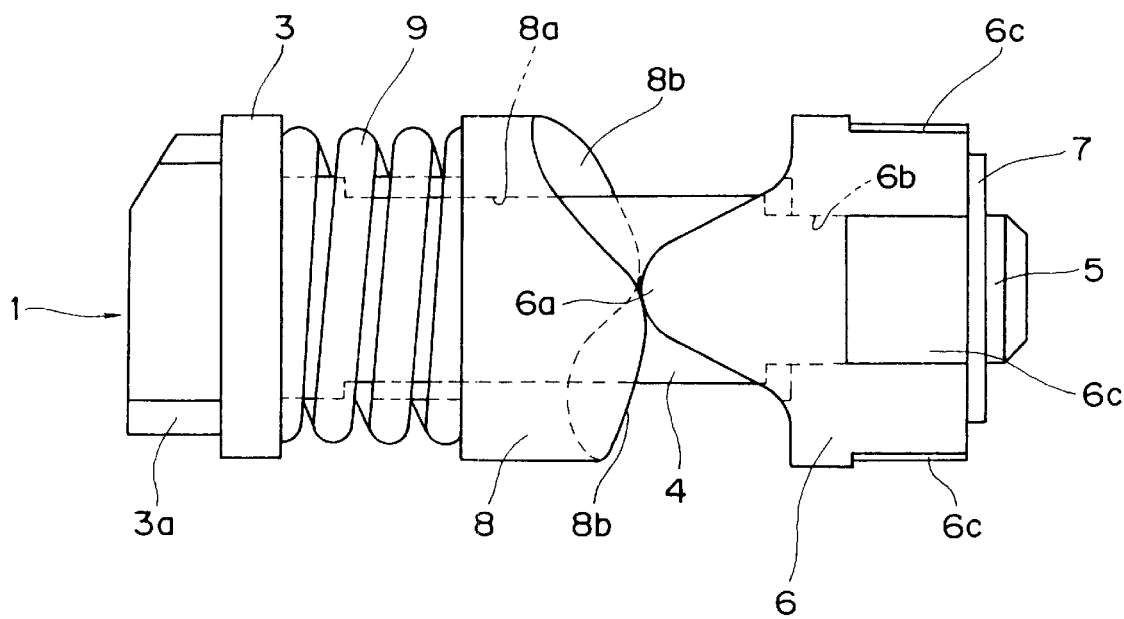
FIG. 2 is a front elevational view of the hinge apparatus in which a slide cam is at a different position from that in FIG. 1.
Figure 3:
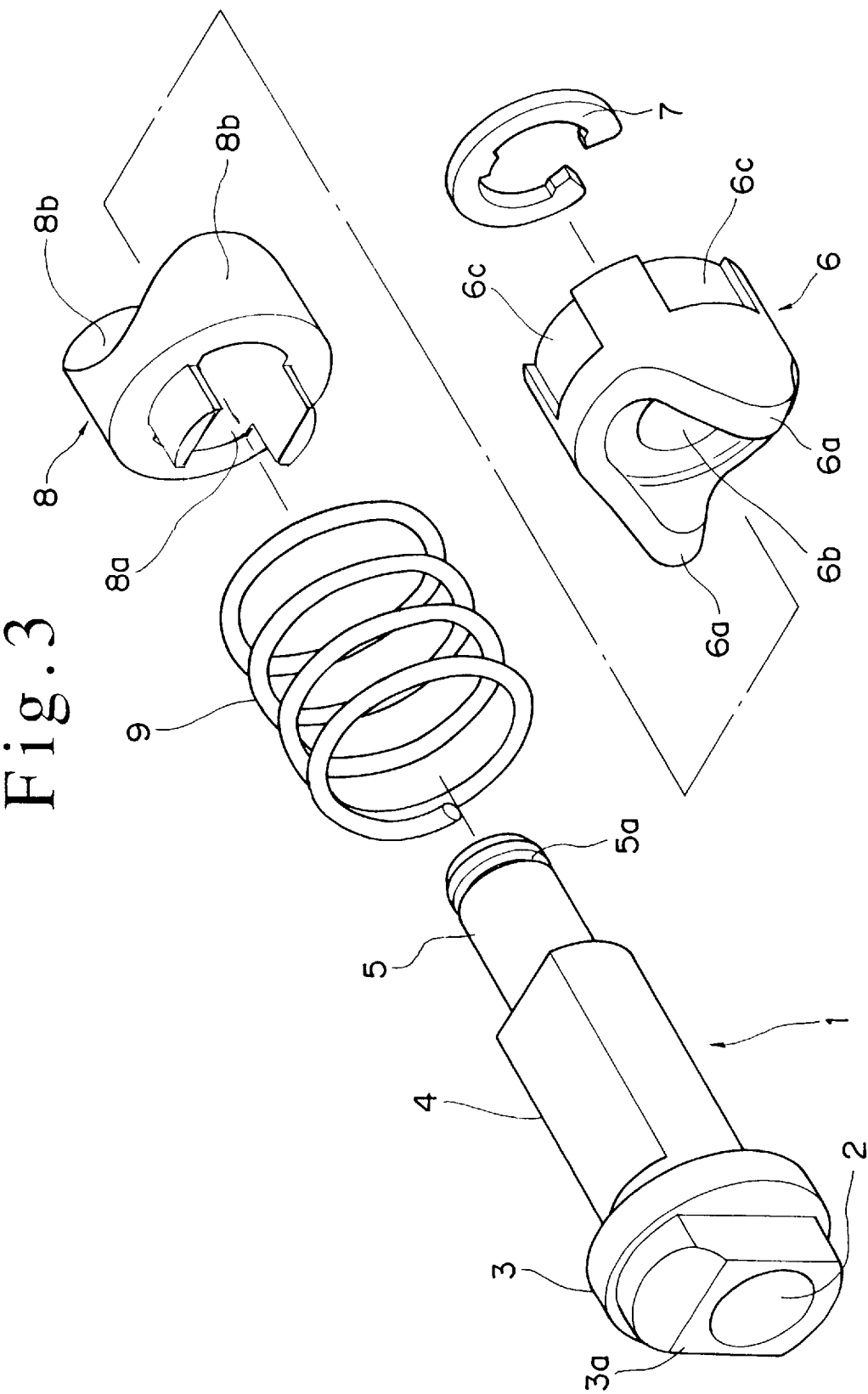
FIG. 3 is an exploded perspective view of the hinge apparatus in FIG. 1.
Figure 4:
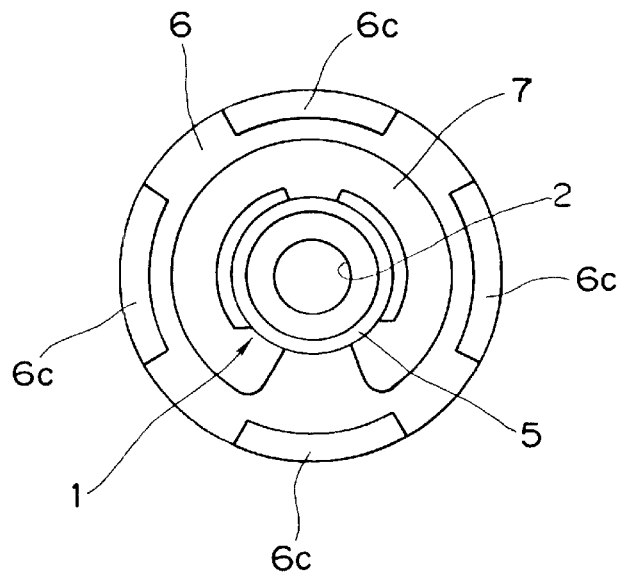
FIG. 4 is a right-side cross-sectional view of the hinge apparatus in FIG. 1.

A preferred embodiment of the present invention will be described with reference to the attached drawings. In FIGS. 1 to 4, reference numeral 1 denotes a shaft having a through hole 2 at its central axis direction. The shaft 1 comprises a flange 3 at its one end. The flange 3 has a fixing member 3a, which is a projection having a substantially-elliptical cross section. The shaft 1 further comprises a deformed shaft 4 having a substantially-elliptical cross section, following the flange 3, and a cylindrical shaft 5 having a substantially-circular cross section, following the deformed shaft 4. At one end of the cylindrical shaft 5, a peripheral groove 5a is formed. Numeral 6 denotes a cam having a pair of projections 6a on one side surface, and a plurality of grooves on its outer periphery as rotation stoppers 6c. The cam 6 has an insertion hole 6b having a circular cross section in the central axis direction. The cylindrical shaft 5 of the shaft 1 is rotatably inserted into the insertion hole 6b, while the cam 6 is engaged with the cylindrical shaft 5 by an E-ring 7 engaged with the peripheral groove 5a. Note that this part is not limited to the E-ring but may be a stopping ring fitted in the peripheral groove 5a or any other known part. The deformed shaft 4 is inserted into a deformed insertion hole 8a provided in the central axis direction, opposing to the cam 6, thereby a slide cam 8 is attached on the shaft 1 slidably toward the deformed shaft 4 and rotatably with the shaft 1. The slide cam 8 has a pair of cam members 8b, having a plurality of projections and recesses, on its side surface opposite to the projections 6a of the cam 6. A compression spring 9 rolled around the shaft 1 is elastically provided between the slide cam 8 and the flange 3. The compression spring 9 always pushes the slide cam 8 toward the cam 6 side. Note that this hinge is small; specifically, the maximum outer diameter of the entire hinge is substantially 5φ, and the length of the entire hinge is about 10 mm.

Figure 5:
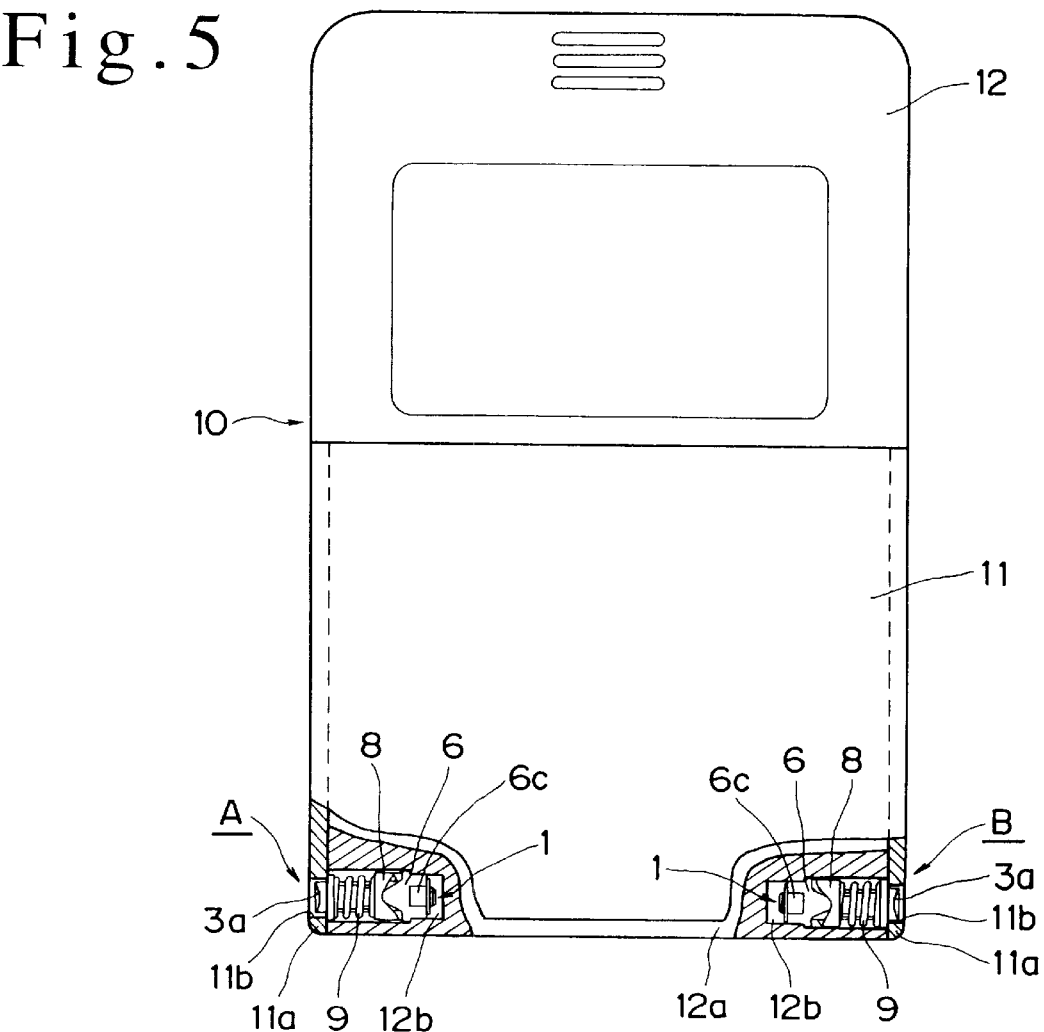
FIG. 5 is a partially cross-sectional plan view of a portable telephone to which the hinge apparatus according to the present invention is applied.
Figure 6:
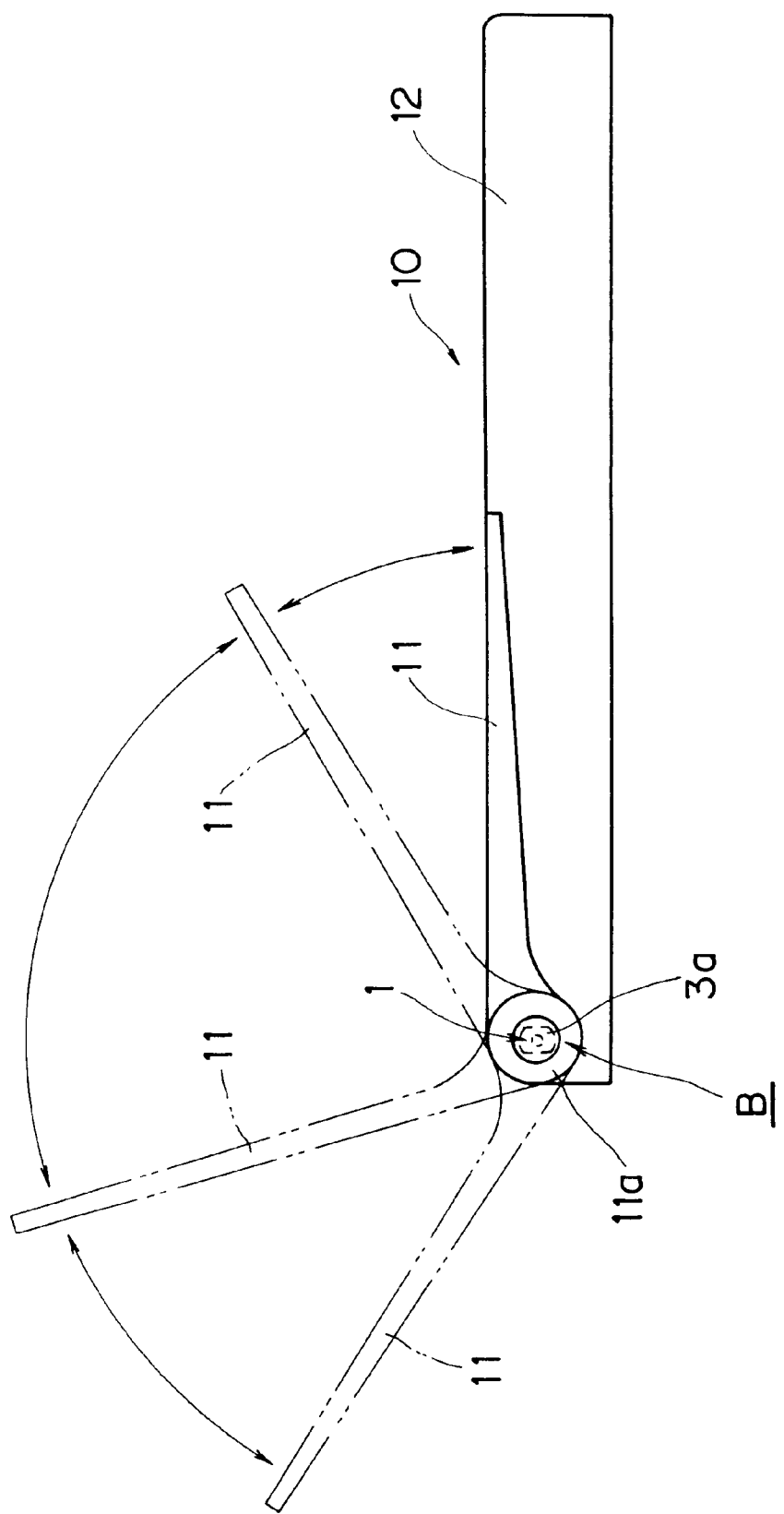
FIG. 6 is a cross sectional view of the portable telephone in FIG. 5.
Figure 7:
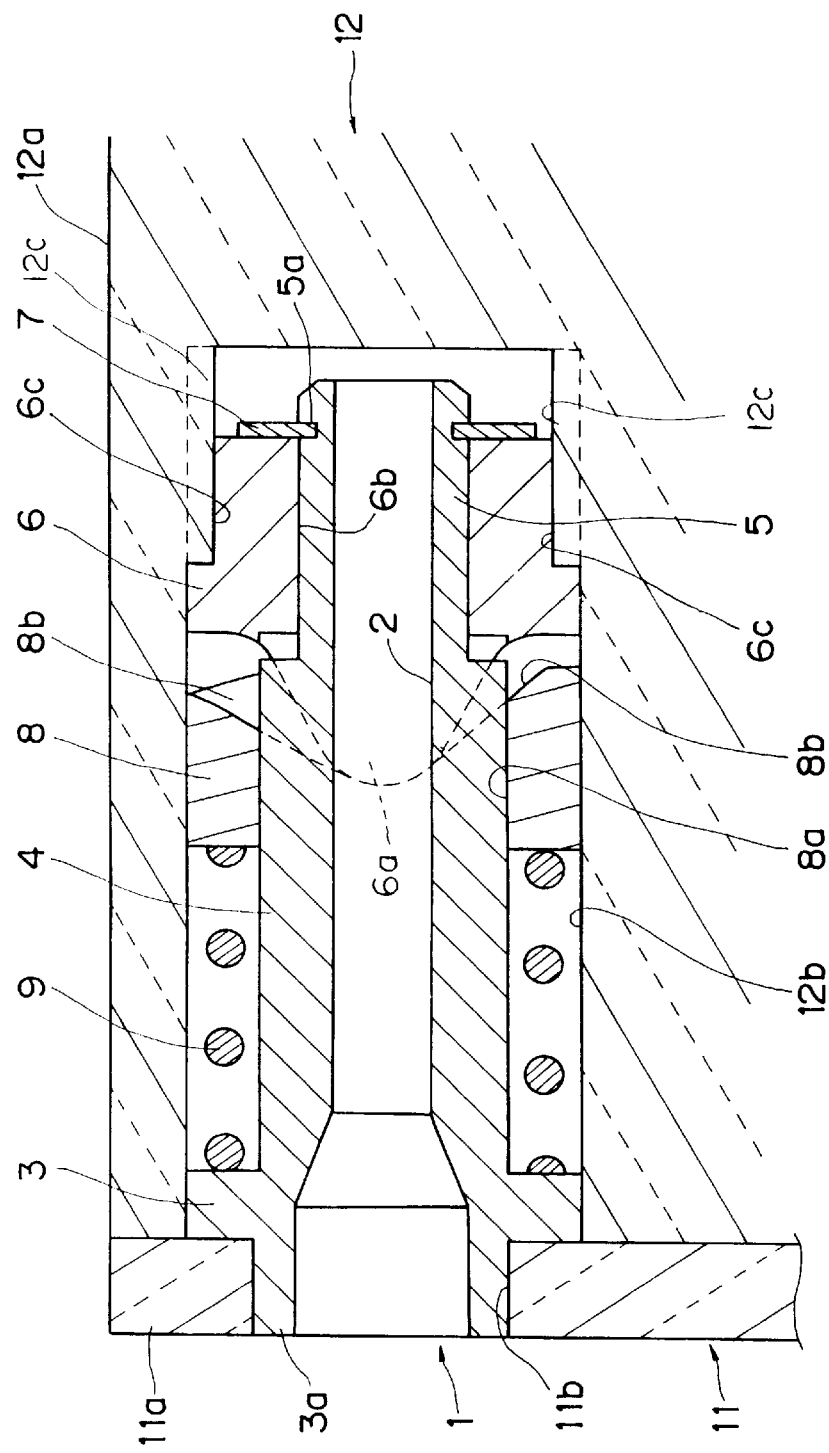
FIG. 7 is a partially-enlarged cross-sectional view of the hinge apparatus of the portable telephone in FIG. 5.

FIGS. 5 to 7 show a case where the hinge apparatus according to the present invention is applied to a portable telephone. Hinge apparatuses A and B of the present invention are used as a pair of right and left hinge portions, and fixed into deformed attachment holes 11b and attachment holes 12b provided at attachment members 11a and 12a, provided at the respective corners of a microphone 11 and a earphone 12 of a portable telephone 10. For example, the hinge apparatuses A and B are inserted, with the cams 6 as hinge heads, into the attachment holes 12b, fixed into the attachment holes 12b of the attachment members 12a of the earphone 12 by engaging the rotation stoppers 6c of the cams 6 with the projections 12c, and the fixing members 3a of the flanges 3 are inserted and engaged with the deformed attachment holes 11b of the attachment members 11a of the microphone 11. When the microphone 11 is opened/closed with respect to the earphone 12, the shafts 1 rotate with the attachment members 11a engaged with the shafts 1. The opening and closing operations of the microphone 11 and the earphone 12 are relatively made. The earphone 12 may be opened/closed with respect to the microphone 11. In this case, the cams 6 rotate with the attachment members 12a engaged with the cams 6 around the shafts 1.

Figure 8:
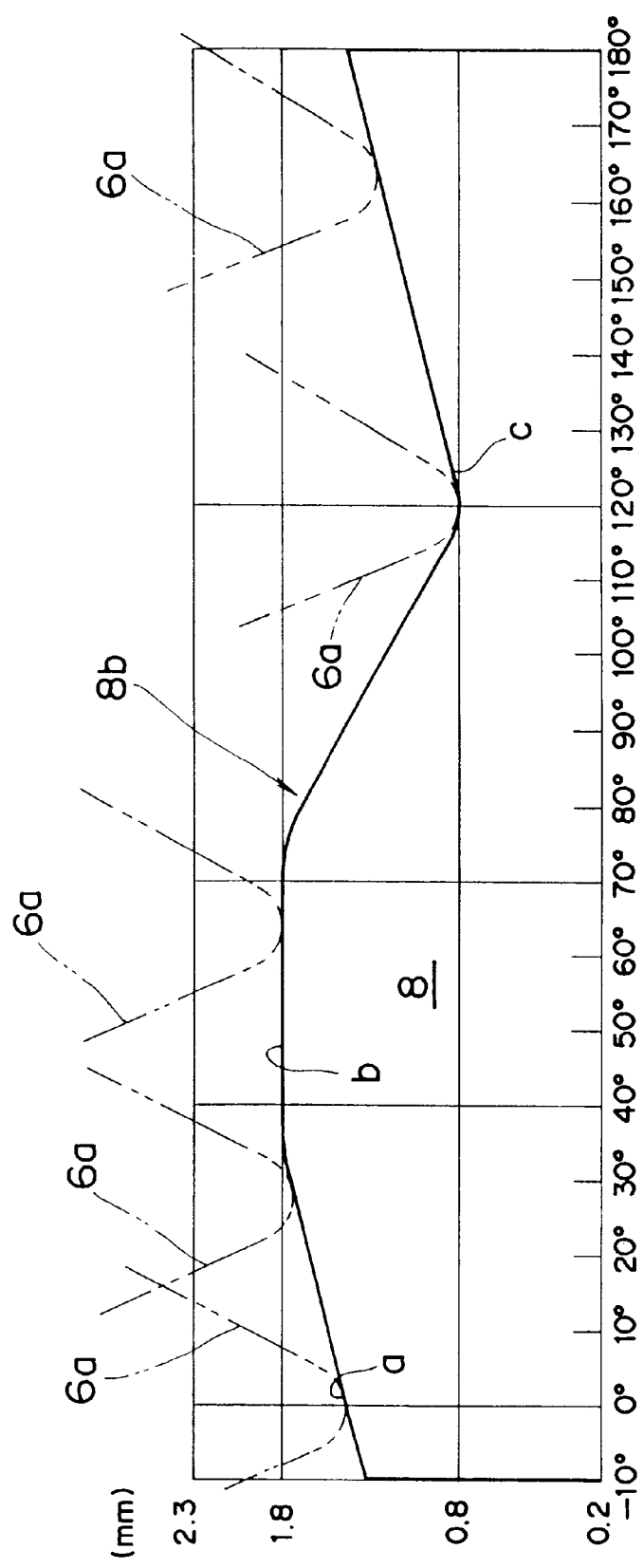
FIG. 8 is a graph explaining operations of a cam and the slide cam.

In FIGS. 6 and 8, when the microphone 11 is closed with respect to the earphone 12, i.e., at 0° to the earphone 12, the projections 6a of the cams 6 are positioned in first recesses a of the cam members 8b of the slide cam 8. As the first recesses a where the projections 6a are located have a sufficient depth, the microphone 11 is pivotally biased in a closing direction and locked in this state. The microphone 11 does not naturally open from this position. When the microphone 11 is opened, the projections 6a move from the first recesses a to raised portions b. When the microphone 11 is positioned at an opening angle of about 70° to the earphone 12, the projections 6a drop into second recesses c, then the microphone 11 naturally opens. When the microphone 11 is positioned at an opening angle of 180° to the earphone 12, the end of the microphone 11 abuts against the end of the earphone 12, and the microphone 11 stops. If the microphone 11 is opened with an opening angle greater than a most-frequently opened angle (about 150°), the microphone 11 receives a biasing force to return the microphone 11 to the most-frequently opened angle. When communication has been completed and the microphone 11 is closed with respect to the earphone 12, at a predetermined closing angle (about 20°), the projections 6a drop into the first recesses a, then the microphone 11 is automatically closed as if it is sucked toward the earphone 12, and the closed state is held as described above.

Note that the control by the hinge apparatuses of the present invention in opening/closing the microphone 11 may be made by various constructions by changing the shapes, setting positions and the like of the cams and projections. Thus, the hinge apparatus of the present invention can be used as a hinge apparatus for opening/closing a display in other small electronic devices.

Note that as another embodiment, fixing members to fix the shaft and the cam members to attachment members are not limited to the above-described fixing member. The shaft and the cam members may be fixed to the attachment members with engaging projections, fixing pins and other means. Further, the members having projections and the members having recesses may be replaced with each other. Furthermore, the shape and setting positions of the projections and recesses can be changed in accordance with various purposes.

According to the present invention having the above construction, as the hinge apparatus is small and has a simple structure with a small number of parts, the apparatus can be manufactured at a very low cost. If the hinge apparatus is used in a portable telephone, the microphone and the earphone are stably locked at opened positions. Further, the microphone and the earphone are stopped freely or stably stopped at a most-frequently opened angle with each other. Thus, the hinge apparatus fulfills functions required in the portable telephone.

When the hinge apparatus according to the present invention is used for opening/closing a display in small electronic devices other than the portable telephone, it can be provided with necessary functions at a low cost by changing the shape and setting positions of projections and cam members provided at the cam and the slide cam.

Having described our inventions as related to the embodiment shown in the accompanying drawing, it is our intention that the invention be not limited by any of the details of description, unless otherwise specified, but rather be construed broadly within its spirit and scope as set out in the accompanying claims.

What is claimed is:

1. A hinge apparatus comprising:
   a shaft, having a flange with fixing means at one end, a deformed shaft at its central portion and a cylindrical shaft at the other end;
   a cam having a rotation stopper; holding said shaft rotatably inserted therethrough, engaged with said shaft;
   a slide cam, engaged with said shaft inserted into a central portion between said cam and said flange, rotatably with said shaft and slidably in an axial direction; and
   a compression spring rolled around said shaft, and elastically provided between said slide cam and said flange, wherein said cam has a pair of projections on one side surface thereof and at opposite positions on said surface.

2. A hinge apparatus comprising:
   a shaft, having a flange with fixing means at one end, a deformed shaft at its central portion, and a cylindrical shaft at the other end;
   a cam having a rotation stopper, holding said cylindrical shaft of said shaft rotatably inserted therethrough, engaged with said cylindrical shaft;

a slide cam, opposite to said cam, engaged with said deformed shaft of said shaft, and attached to said deformed shaft slidably in an axial direction; and a compression spring rolled around said shaft, and elastically provided between said slide cam and said flange, wherein said cam has a pair of projections on one side surface at opposite positions, and wherein said slide cam has cam members having a plurality of recesses and projections press-contacted with said projections.

3. A hinge apparatus for connecting a microphone having an attachment member with an attachment hole and an earphone having an attachment member with an attachment hole of a portable telephone with each other, comprising:

a shaft having a flange with a first rotation stopper fixed in the attachment hole of one of the microphone or earphone;

a cam having a second rotation stopper, holding said shaft rotatably inserted through an insertion hole provided in a central axis direction of said shaft, engaged with the shaft, and fixed in the attachment hole of the other of the microphone or earphone;

a slide cam, provided between said cam and said flange, engaged with said shaft inserted through a central portion, rotatably with said shaft and slidably in the axial direction; and a compression spring rolled around said shaft, and elastically provided between said slide cam and said flange, wherein said cam has a pair of projections on one side surface at opposite positions, and wherein said slide cam has cam members that are press-contacted with said projections.

4. A hinge apparatus for connecting a microphone and an earphone of a portable telephone with each other, comprising:

a shaft having a flange with a rotation stopper, fixed in a hole provided in one of the microphone or earphone, at one end;

a cam having a first rotation stopper, holding a cylindrical shaft of said shaft rotatably inserted though an insertion hole provided at a central axis direction of said shaft, engaged with said cylindrical shaft at the other end of said shaft, and fixed in a hole provided in the other of the microphone or earphone;

a slide cam, opposite to said cam, engaged with a deformed shaft of said shaft rotatably with the deformed shaft and slidably in the axial direction; and a compression spring rolled around said shaft, and elastically provided between said slide cam and said flange, wherein said cam has a pair of projections on one side surface at opposite positions, and wherein said slide cam has cam members having a plurality of recesses and projections press-contacted with said projections.

5. A hinge apparatus according to claim 1, wherein said cam has cam members having a plurality of recesses and projections; and wherein said slide cam has a pair of projections that are press-contacted with said cam members.

6. A hinge apparatus according to claim 2 wherein said cam has cam members having a plurality of recesses and projections; and wherein said slide cam has a pair of projections that are press-contacted with said cam members.

7. A hinge apparatus according to claim 3 wherein said cam has cam members having a plurality of recesses and projections; and wherein said slide cam has a pair of projections that are press-contacted with said cam members.

8. A hinge apparatus according to claim 4 wherein said cam has cam members having a plurality of recesses and projections; and wherein said slide cam has a pair of projections that are press-contacted with said cam members.

* * * * *